Figure 1:
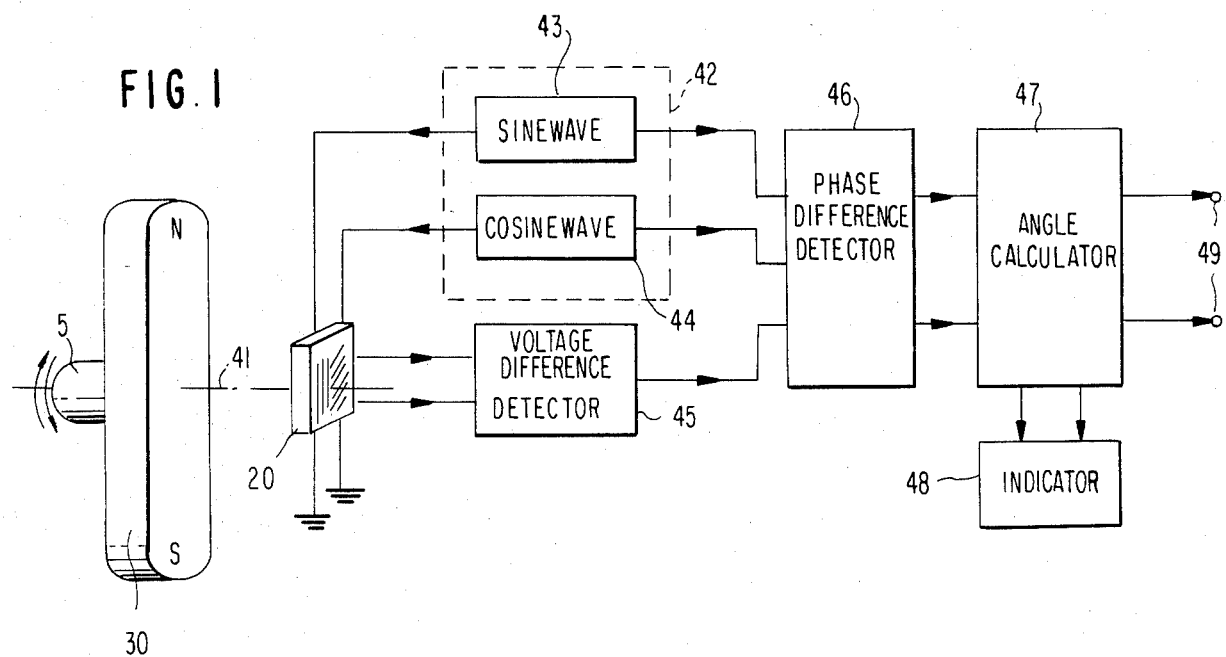

United States Patent [19]

Ito

[11] Patent Number: 4,490,674

[45] Date of Patent: Dec. 25, 1984

[54] ROTATIONAL ANGLE DETECTION DEVICE HAVING TWO MAGNETORESISTIVE SENSING ELEMENTS

[75] Inventor: Susumu Ito, Tokyo, Japan

[73] Assignee: Nippon Electric Co., Ltd., Tokyo, Japan

[21] Appl. No.: 442,690

[22] Filed: Nov. 18, 1982

[30] Foreign Application Priority Data

Nov. 18, 1981 [JP] Japan .................................. 56-184802

[51] Int. Cl.³ ........................ G01B 7/14; G01N 27/72; G01R 33/12
[52] U.S. Cl. .................................... 324/208; 324/233; 324/235; 324/252
[58] Field of Search ............... 324/207, 208, 233, 235, 324/252, 260, 165, 174, 61 R, 234

[56] References Cited

U.S. PATENT DOCUMENTS

| 4,039,946 | 8/1977 | Nola | 324/165 |
| 4,274,053 | 6/1981 | Ito et al. | 324/174 |
| 4,283,679 | 8/1981 | Ito et al. | 324/208 X |
| 4,401,944 | 8/1983 | Narimatsu et al. | 324/207 |

Primary Examiner—Gerard R. Strecker
Assistant Examiner—Warren S. Edmonds
Attorney, Agent, or Firm—Sughrue, Mion, Zinn, Macpeak, and Seas

[57] ABSTRACT

A rotational angle detection device having two magnetoresistive sensing elements positioned at a 45° angle with respect to each other senses the rotary position of a permanent magnet. Sine and cosine waves are applied to first and second bridge circuits respectively incorporating the two sensing elements. The resulting bridge circuit outputs are differentially combined to provide an output whose phase relative to either of the input sine or cosine waves is dependent upon the rotational position of the permanent magnet. The phase difference is detected and the rotational position is calculated therefrom.

21 Claims, 16 Drawing Figures

ROTATIONAL ANGLE DETECTION DEVICE HAVING TWO MAGNETORESISTIVE SENSING ELEMENTS

The present invention relates to a rotational angle detection device having ferromagnetic magnetoresistive elements (MR elements) and a permanent magnet.

Accurate detection of the rotational angle of a rotatable shaft attached to a motor or a gear is frequently needed for various purposes such as the control of precision instruments. To meet such a requirement, several hardware constructions have been proposed. One example of those constructions is the rotary encoder composed of a considerable number of magnets arranged on the surface of a rotating body and a magnetic field sensor, as disclosed in the U.S. Pat. No. 4,274,053. In the proposed rotary encoder, however, such magnets must be arranged on the rotating body with high accuracy and density to achieve a high resolution in rotational angle detection. This results in a complicated, expensive device.

An object of the present invention, therefore, is to provide a simplified and inexpensive rotational angle detection device free from the above-mentioned disadvantages.

According to one aspect of the present invention, there is provided a rotational angle detection device, which comprises:

a permanet magnet in response to the rotation of a rotary shaft, for generating a rotating magnetic field;

power supplying means for generating sine wave and cosine wave outputs;

a magnetic field sensor, having at least two magnetoresistive sensing elements formed of ferromagnetic material so as to form a 45° angle to each other, for generating two electrical outputs representing the rotation of said roraty shaft in response to the sine and cosine wave outputs from said power supplying means;

a voltage difference detector for detecting the difference between the two electrical outputs of said sensor;

a phase difference detector for detecting the phase difference between either of the two outputs of said power supplying means and the output of said voltage difference detector; and a rotational angle calculator for calculating the rotational angle of the rotating shaft depending on the output from the phase difference detector.

Figure 4A:
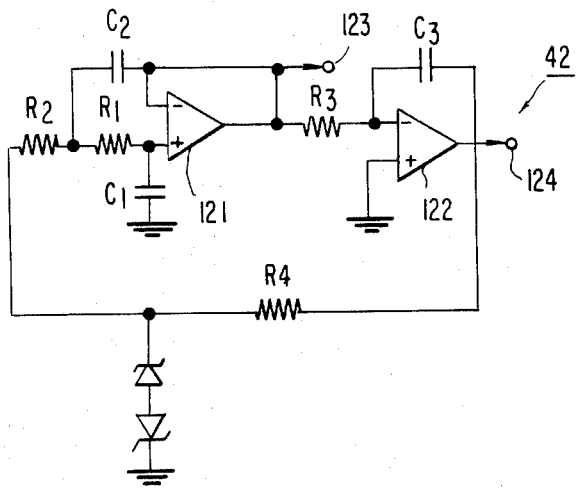
Figure 4B:
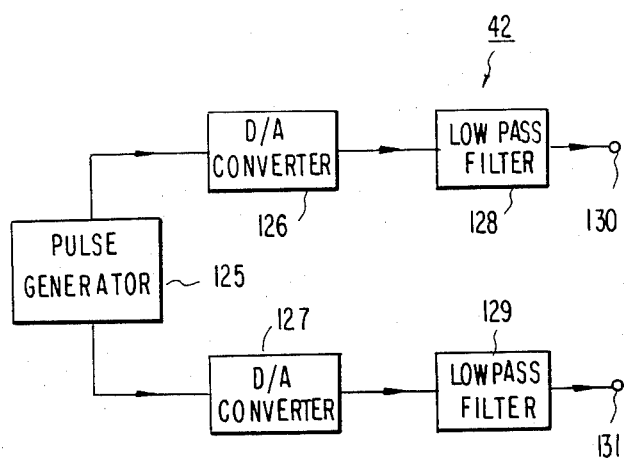
Figure 5A:
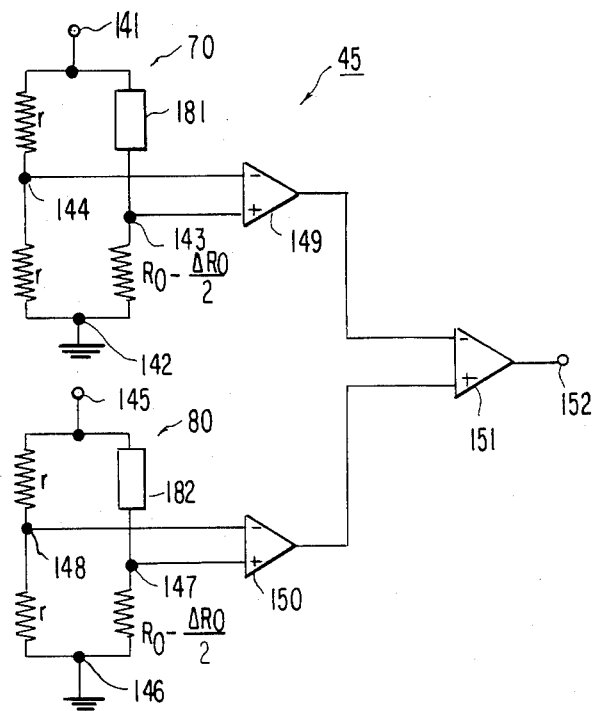
Figure 5B:
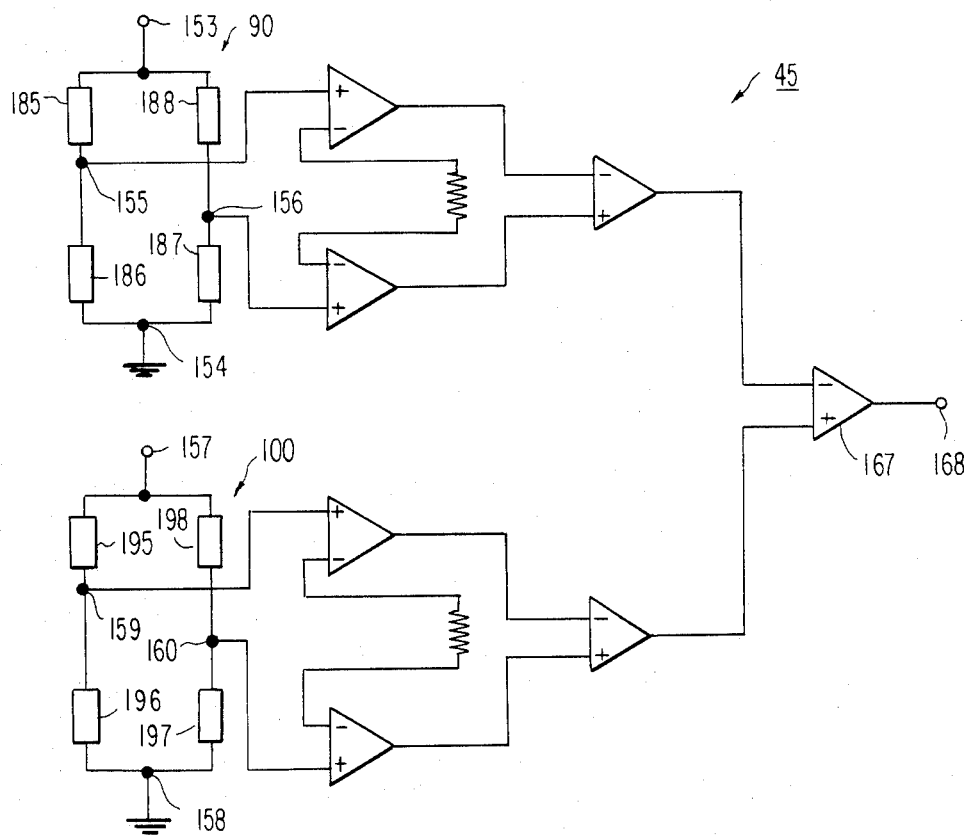
Figure 6:
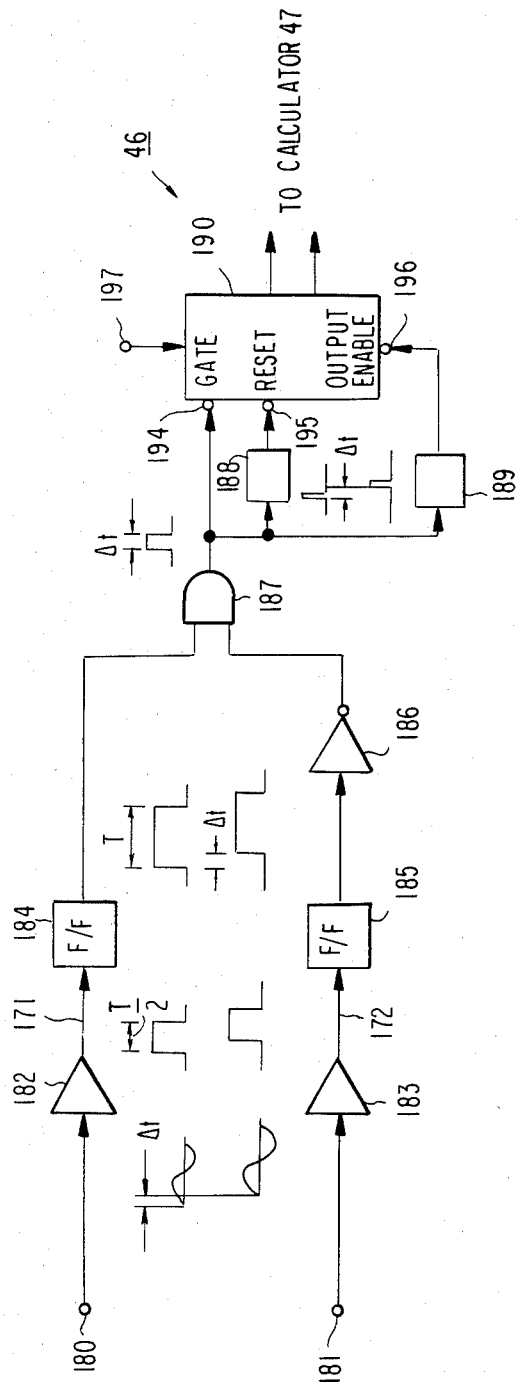
Figure 7:
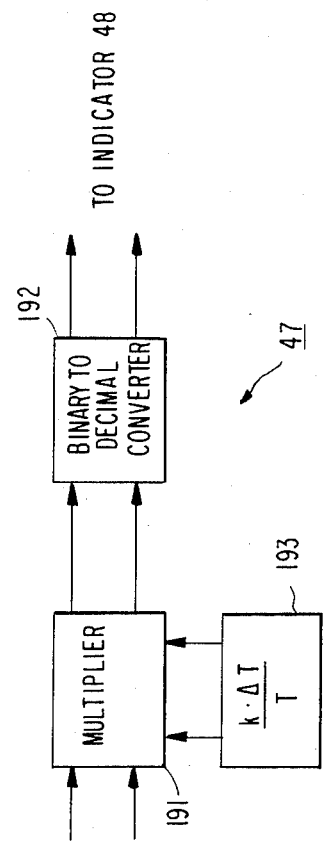
Figure 8:
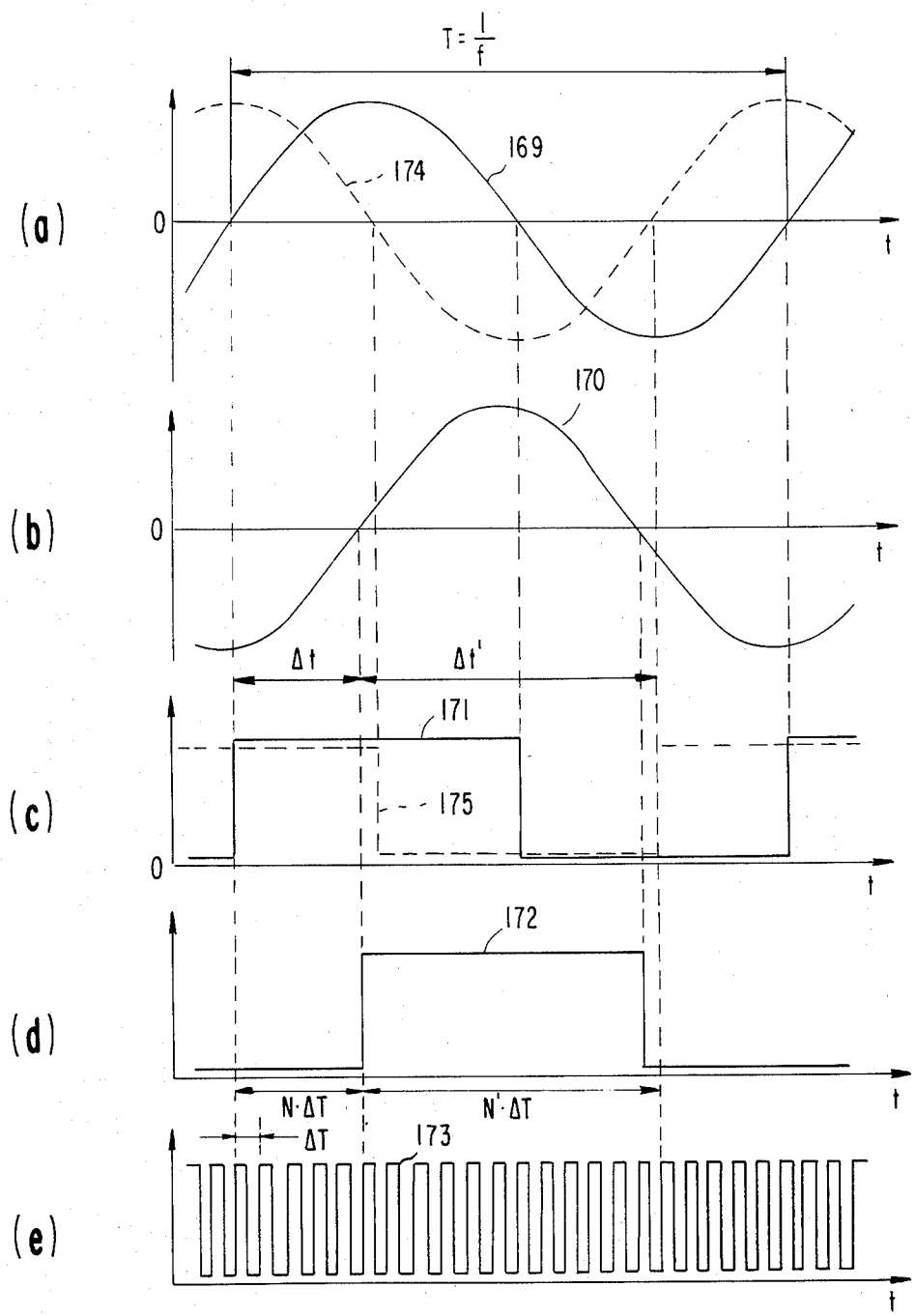

Other features and advantages of the present invention will become apparent from the detailed description hereunder when taken in conjunction with the accompanying drawings, wherein:

FIG. 1 is a block diagram of one embodiment of the invention;

FIGS. 2A to 2D, 3A to 3D, 4A, 4B, 5A, 5B, 6, and 7 illustrate detailed examples of various parts of the embodiment; and FIG. 8 includes diagrams (a) to (e) showing waveforms for illustrating the operation of the circuits shown in FIGS. 5A and 6.

Like reference numerals denote like structural elements.

Referring to FIG. 1, the embodiment of the invention comprises a permanent magnet 30 attached to a rotatable shaft 5; a magnetic field sensor 20 arranged on the extension of the rotating axis of the shaft 5 and having at least a pair of MR elements so as to form a 45° angle to each other, for generating two electrical outputs; an A.C. (alternate current) power supply circuit 42 for generating cosine and sine wave outputs at a frequency f; a voltage difference detector 45 responsive to the sensor 20 for detecting the difference between the two outputs of the sensor 20; a phase difference detector 46 for detecting the phase difference between either of said cosine and sine wave outputs and the output of the detector 45; an angle calculator 47 for detecting the rotational angle of the shaft 5 from said phase difference detected; and an indicator 48 for indicating the rotational angle thus detected.

The individual structural elements will be described with reference to FIGS. 2 to 5.

Figure 2A:
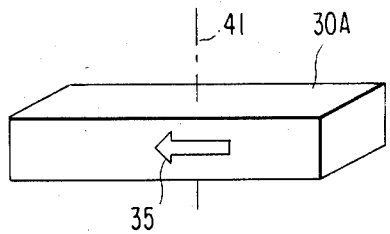

Referring to FIG. 2A, the magnet 30 shown in FIG. 1 may be a bar magnet 30A, magnetized in the direction 35 of magnetization, generates a rotating magnetic field parallel to the sensor 20 shown in FIG. 1 in the vicinity of a rotational axis 41. The bar magnet 30A may also have an intensity higher than a predetermined value H, which allows the magnetization direction of the MR elements of the sensor 20 to be parallel to the direction of the magnetic field generated by the magnet 30A. The value H is determined on the basis of the material of the sensor 20 used and the distance between the magnet 30A and the sensor 20. A suitable material for the magnet 30A includes such well-known substances as a cobalt-rare earth compound, ferrite containing barium ferrite, an Fe-Ni-Co-Al alloy, a Pt-Co alloy, an MnAl alloy, an Fe-Co-V, or an Fe-Co-Cr alloy. It is generally desirable that the distance between the magnetic poles of the magnet 30A should be greater than the longitudinal length of the sensor 20.

Figure 2B:
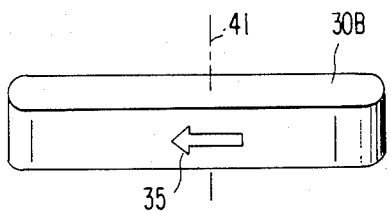
Figure 2C:
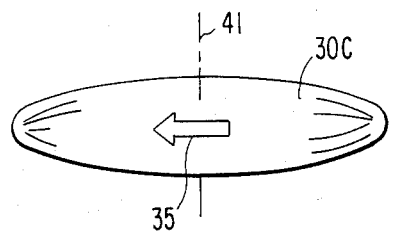
Figure 2D:
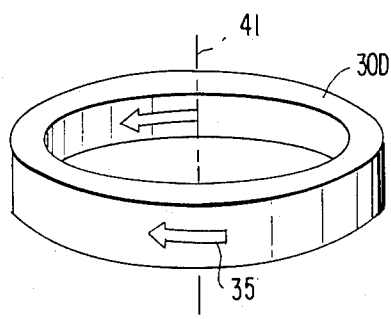

FIGS. 2B to 2D show other conceivable shapes of the magnet 30 shown in FIG. 1. A magnet 30B in FIG. 2B is a modification of that in FIG. 2A, rounded at its corners to sharpen the divergence of magnetic flux. A magnet 30C shown in FIG. 2C consists of a rotating oval body to readily provide a single magnetic domain, whereas the central portion of a magnet 30D shown in FIG. 2D is perforated.

Figure 3A:
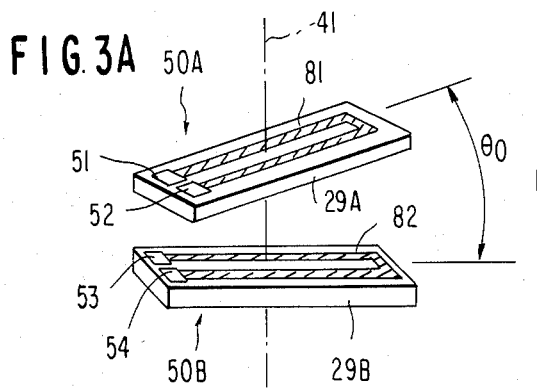

Referring now to FIG. 3A, the sensor 20 comprises a sensing element 50A having a substrate 29A and an MR element 81 with electrodes 51 and 52 formed on the substrate 29A, and a sensing element 50B, having a substrate 29B and an MR element 82 with electrodes 53 and 54 formed on the substrate 29B. The substrate 29A is disposed over the substrate 29B so that the MR elements 81 and 82 form an angle $\theta = 45°$ with each other. Each of the substrates 29A and 29B may be composed of a nonmagnetic insulating body having a smooth surface, such as a single crystal Si covered with glass or $SiO_2$ or a ceramic body mainly consisting of $Al_2O_3$. As shown in FIG. 3A, each of the MR elements 81 and 82 has a plurality of parallel strips, or a stripe group. Each strip is 10 to 100 microns wide 200 to 20,000 angstroms thick, and is made of a known material such as an Ni-Fe alloy, an Ni-Co alloy, or an Ni-Fe-Co alloy-each of the electrodes 51 to 54 is made of Au, Al or Cu. A magnetic field intensity of about thirty gausses is observed in the surface of the MR elements 83 and 84 consisting of $Ni_{80}Fe_{20}$ and measuring 20 microns wide and 500 angstroms thick.

Figure 3B:
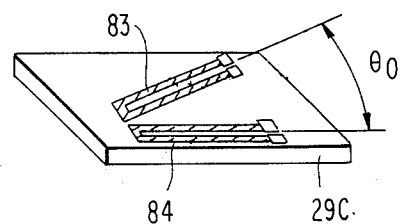
Figure 3C:
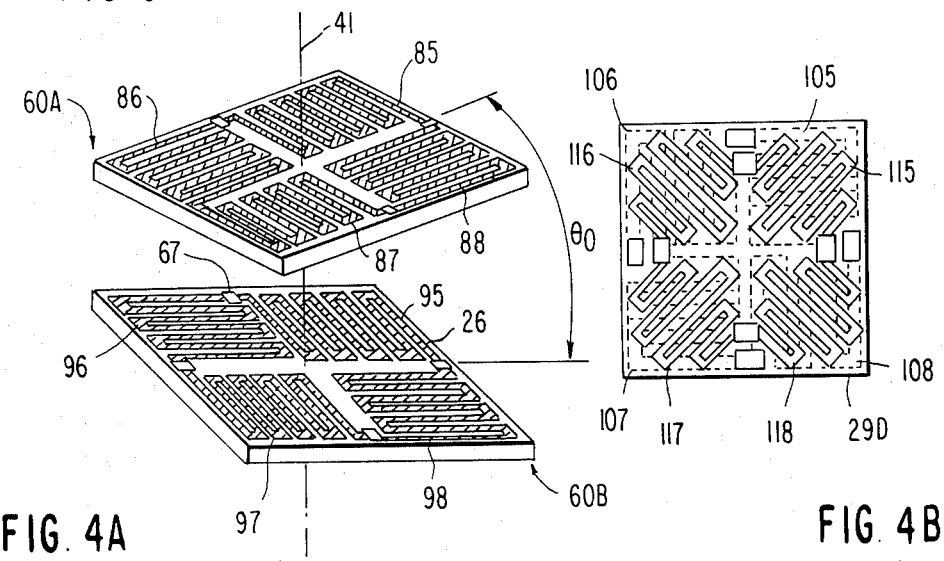
Figure 3D:
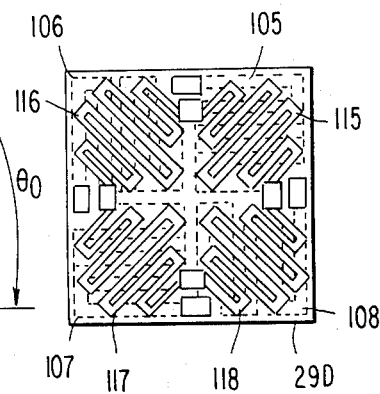

FIGS. 3B to 3D illustrate other arrangements of the sensor 20 shown in FIG. 1.

As shown in FIG. 3B, the sensor 20 having two MR elements 83 and 84 formed on the same substrate 29C has a simpler structure than that of FIG. 3A.

In the sensor 20 shown in FIG. 3C, sensing elements 60A and 60B are composed of four MR elements each, 85 to 88 and 95 to 98, respectively, so that they can achieve greater outputs than the elements 50A and 50B in FIG. 3A. The elements 60A and 60B, like their counterparts in FIG. 3A, are arranged at a 45° angle to each other.

The sensor 20 illustrated in FIG. 3D is composed of a substrate 29D, MR elements 105 to 108 formed on the substrate 29D corresponding to the four MR elements shown in FIG. 3C, and MR elements 115 to 118 arranged over the MR elements 105 to 108, respectively, with an insulating layer in-between (not illustrated).

The power supply 42 of the circuit of FIG. 1 is illustrated in FIG. 4A and comprises amplifiers 121 and 122, resistors $R_1$ and $R_2$ and capacitors $C_1$ and $C_2$. From a terminal 123 is supplied a sine wave output, and from a terminal 124, a cosine wave output, both at a frequency f:

$$f = \frac{1}{2\pi \sqrt{R_1 R_2 C_1 C_2}} \quad (1)$$

The power supply circuit 42 shown in FIG. 4B is composed of a pulse generator 125 for generating two electrical pulse trains, each of which has a repetition period of $T(=(1/f))$. Also, these pulse trains have a phase difference of (T/4) with each other. The circuit 42 further includes digital to analog (D/A) converters 126 and 127 for converting the two pulse trains into analog signals, and low-pass filters 128 and 129 for smoothing the output of the D/A converters 126 and 127.

Referring to FIG. 5A, a detector 45 suitable for use with the sensor 20 illustrated in FIGS. 3A and 3B is shown. A first bridge circuit 70 has three registers and an MR element 181 of the sensor 20. The sine wave output from the circuit 42 of FIG. 4A is applied at terminal 141 of the bridge circuit 70, which produces an output to indicate a voltage change due to the resistance change of the MR element 181. The voltage change is superimposed on a sine wave output. A differential amplifier 149 outputs a difference between the outputs appearing at two terminals 143 and 144 of the circuit 70. A second bridge circuit 80 includes an MR element 182 of the sensor 20 and has the same structure as that of the circuit 70. The cosine wave output from the circuit 42 shown in FIG. 4A is applied to the bridge circuit 80 through terminals 145 and 146 to produce an output to indicate a voltage change due to the resistance change of the MR element 182 superimposed on said cosine wave output. A differential amplifier 150 outputs a difference between the outputs appearing at two terminals 147 and 148 of the circuit 80. A differential amplifier 151 produces a difference between the two outputs of the amplifiers 149 and 150.

Referring now to FIG. 5B, a detector 45 suitable for use with the sensor 20 shown in FIGS. 3C and 3D is illustrated. A first bridge circuit 90 consisting of four MR elements 185 to 188 (corresponding to those elements 85 to 88 and 105 to 108 shown in FIGS. 3C or 3D) and a second bridge circuit 100 comprising four MR elements 195 to 198 (corresponding to those elements 95 to 98 or 115 to 118 in FIGS. 3C and 3D) are connected to differential 160-167 as shown. The detector shown in FIG. 5B produces a difference in voltage between the two bridge circuits 90 and 100 in a similar manner to the detector shown in FIG. 5A. It should be noted that low-pass filter means may be employed at a stage subsequent to the amplifiers 151 and 167 to eliminate undesirable noise.

Referring to FIG. 6, the phase difference detector 46 has a terminal 180 for receiving the sine wave output 169 from the circuit 42 as a reference value (see FIG. 8(a)) and a terminal 181 for receiving difference signal 170 (FIG. 8(b)) from the detector 45 shown in FIG. 5A. These two signals, after being converted by comparators 182 and 183 into pulse trains 171 and 172 (FIGS. 8 (c) and (e)), and frequency-divided by two by flip-flops (F/Fs) 184 and 185. An AND gate 187 supplies a signal 198 representing the phase difference between the sine wave output 169 and the difference signal 170 by obtaining a logical product of the output of the F/F 185, inverted by a NAND gate 186, and that of the F/F 184.

A leading-edge detecting circuit 188 and a trailing-edge detecting circuit 189 respectively detect the leading and trailing edges of the signal 198 from the gate 187. The outputs therefrom are applied to a reset terminal 195 and an output-enabling terminal 196 of a counter 190. With a binary "1" of the signal 198 applied at its gate terminal 194, the counter 190 starts counting clock pulses 173 of a period ΔT (FIG. 8(e)) applied to a clock terminal 197 in response to the leading edge of the signal 198. The counter 190 stops its counting operation to feed its output to the angle calculator 47 in response to the trailing edge of the signal 198 applied at the terminal 196. The relationship between the output (Δt=N·ΔT) of the counter 190 and the rotational angle θ of the magnet 30 is represented by the following equation:

$$\theta = \pi f \Delta t = \pi \cdot \frac{\Delta t}{T} = \pi \cdot \frac{N \Delta T}{T} \quad (2)$$

The angle calculator 47 illustrated in FIG. 7 is composed of a coefficient circuit 193 for producing an output (π·ΔT/T), an multiplier 191 for multiplying the output (N) of the phase difference detector 46 (FIG. 6) by (πΔT/T) given from the circuit 193, and a binary to decimal converter 192 for converting the output of the multiplier 191 into a decimal value.

The operating principle of the present invention will be described hereunder referring to FIGS. 3, 5A, 5B, and 8. The direction of magnetization M1 of the MR element 81 (FIG. 3) is substantially parallel to the direction of the magnetic field generated by the magnet 30 as long as the magnetic field has an intensity greater than the above-referred value H. For this reason, the magnetization $M_1$ rotates in concurrence with the rotational angle θ of the magnet 30. Supposing that the lengthwise direction of the stripes of the MR element 81 is the reference direction of the rotation of the magnet 30, i.e., θ=0, the magnetization $M_1$ is inclined by θ from the direction of a sensing current J flowing through the MR element 81, when the rotational angle of the magnet is θ. On the other hand, the resistance Rs of the MR element 81 is generally represented by the following equation depending on the angle θ formed by the sensing current J and the magnetization $M_1$:

$$Rs = Ro - \Delta Ro \sin^2\theta = \left(Ro - \frac{\Delta Ro}{2}\right) + \frac{\Delta Ro}{2} \cos 2\theta \quad (3)$$

where Ro is the resistance when $\theta=0$ or the sensing current J is parallel to the magnetization $M_1$, and $\Delta Ro$ is the maximum value of the resistance Rs. Similarly, equation (3) applies to each of the MR elements 83, 85, 87, 105 and 107. Meanwhile, each resistance Rs' of the MR elements 86, 88, 106 and 108, where the direction of the sensing currents J is inclined in advance by $90° = (\pi/2)$, is represented by the following equation:

$$Rs' = Ro - \Delta Ro \sin^2\left(\theta + \frac{\pi}{2}\right) = \quad (4)$$

$$\left(Ro - \frac{\Delta Ro}{2}\right) - \frac{\Delta Ro}{2} \cos 2\theta$$

Thus, this resistance Rs' varies in a reverse way with equation (3). Similarly, each resistance Rc of the MR elements 82, 84, 95, 97, 115 and 117 where the direction of the sensing current J is inclined in advance by $45° = (\pi/4)$, is represented by the following equation:

$$Rc = Ro - \Delta Ro \sin^2\left(\theta + \frac{\pi}{4}\right) = \quad (5)$$

$$\left(Ro - \frac{\Delta Ro}{2}\right) - \frac{\Delta Ro}{2} \sin 2\theta$$

Further, each resistance Rc' of the MR elements 96, 98, 116 and 118 where the direction of the sensing current J is inclined in advance by $135° = 3\pi/4$, is represented as follows:

$$Rc' = Ro - \Delta Ro \sin^2\left(\theta + \frac{3\pi}{4}\right) = \quad (6)$$

$$\left(Ro - \frac{\Delta Ro}{2}\right) + \frac{\Delta Ro}{2} \sin 2\theta$$

In the detector shown in FIG. 5A with a sine wave voltage, i.e., Vo sin $2\pi$ ft applied between the terminals 141 and 142 of the bridge circuit 70 (where Vo represents the maximum amplitude of the sine wave voltage), the voltage Vs appearing between the terminals 143 and 144 will be expressed by the following equation:

$$Vs \approx -\frac{1}{8} \cdot \frac{\Delta Ro}{Ro} \cdot Vo \cdot \sin 2\pi ft \cdot \cos 2\theta \quad (7)$$

On the other hand, upon application of a cosine wave voltage, i.e., Vo cos $2\pi$ ft between the terminals 145 and 146 of the bridge circuit 80, the voltage Vc between terminals 147 and 148 will be:

$$Vc \approx +\frac{1}{8} \cdot \frac{\Delta Ro}{Ro} \cdot Vo \cdot \cos 2\pi ft \cdot \sin 2\theta \quad (8)$$

Supposing the amplification factor for each of the amplifiers 149, 150 and 151 is G, the output at the terminal 152 will be:

$$V \approx \frac{1}{8} \cdot \frac{\Delta Ro}{Ro} \cdot Vo \cdot G \cdot (\sin 2\pi ft \cdot \cos 2\theta + \cos 2\pi ft \cdot \sin 2\theta) \quad (9)$$

$$\approx \frac{1}{8} \cdot \frac{\Delta Ro}{Ro} \cdot Vo \cdot G \cdot \sin(2\pi ft + 2\theta)$$

It is thus seen that the output of the detector 45 lags in phase behind, by $\Delta t$ defined by equation (2), the sine wave output given from the circuit 42.

Similarly, where the detector of FIG. 5B is used, the voltage Vs appearing between terminals 155-156 and the voltage Vc between terminals 159-160, respectively, will be:

$$Vs \approx -\frac{1}{2} \cdot \frac{\Delta Ro}{Ro} \cdot \cos 2\theta \quad (10)$$

$$Vc \approx +\frac{1}{2} \cdot \frac{\Delta Ro}{Ro} \cdot \sin 2\theta \quad (11)$$

Then, supposing the amplification factor for each of the amplifiers 161, 162, 163, 164, 165, and 166 and 167 is G', the output V' of the detector of FIG. 5B expressed by $$V' \approx \frac{1}{2} \cdot \frac{\Delta Ro}{Ro} \cdot Vo \cdot G' \cdot \sin(2\pi ft + 2\theta) \quad (12)$$

will be obtained at the output terminal 168, indicating that the relationship between the angle $\theta$ of the magnet and the time difference $\Delta t$ is given by equation (2). As shown in FIG. 8, though the sine wave voltage 169 is used as the above-mentioned reference value in detecting the phase difference $\Delta t$, it must be obvious that the cosine wave output 174 can be used as well. In this case, a phase difference (time difference $\Delta t'$) lagging in advance by a fixed phase difference of $(\pi/2)(=(\pi/4))$ will be observed and, upon counting the number of pulses N' as shown in, FIG. 8(e), the angle shall be detected from $$\theta = \frac{\pi}{T}\left(T - \frac{T}{4} - N' \cdot \Delta T\right) \quad (13)$$

If the sine and cosine wave voltages 169 and 174 are simultaneously used, there will be the relationship of $$N \cdot \Delta T + N' \cdot \Delta T = \frac{3}{4} T$$

so that it can be checked whether or not the sum of N and N' is a constant value, resulting in a rotational angle detection device hardly affected by noise.

As has been described above, this invention allows the achievement of a simplified, inexpensive rotational angle detection device by the use of a single permanent magnet and the simple circuit structure electronically designed.

What is claimed is:
1. A rotational angle detection device comprising:
  a permanent magnet rotatable in response to the rotation of a rotary shaft for generating a rotating magnetic field;

power supplying means for generating sine wave and cosine wave outputs;

a magnetic field sensor having said sine wave and cosine wave outputs applied thereto and being responsive to the magnetic field of said permanent magnet for generating an altered sine wave output and an altered cosine wave output having phase angles dependent upon the rotational position of said permanent magnet, said magnetic field sensor comprising at least two magnetoresistive sensing elements formed of ferromagnetic material and positioned to form a 45° angle therebetween;

a voltage difference detector for detecting the difference between said altered sine wave and altered cosine wave outputs;

a phase difference detector for detecting the phase difference between either of the two outputs of said power supplying means and the output of said voltage difference detector; and a rotational angle calculator for calculating the rotational angle of said rotary shaft on the basis of the output from said phase difference detector.

2. A rotational angle detection device as claimed in claim 1 wherein said sensor comprises a first magnetoresistive sensing element having first to fourth stripe groups formed of ferromagnetic material connected electrically in series so that two adjacent stripe groups among said first to fourth stripe groups form an angle of 90° with each other and a second magnetoresistive sensing element having the same structure as the first sensing element and being disposed over said first sensing element to give the relationship in which two vertically corresponding stripe groups of said first and second sensing elements form an angle of 45° with each other.

3. A rotational angle detection device as claimed in claim 2 wherein said first and second magnetoresistive sensing elements are arranged on different substrates from each other.

4. A rotational angle detection device as claimed in claim 3 wherein the central portion of said permanent magnet is perforated.

5. A rotational angle detection device as claimed in claim 3 wherein said permanent magnet is bar-shaped.

6. A rotational angle detection device as claimed in claim 2 wherein said first and second magnetoresistive elements are arranged on one substrate, one over the other, with an insulating layer in-between.

7. A rotational angle detection device as claimed in claim 6 wherein said permanent magnet is bar-shaped.

8. A rotational angle detection device as claimed in claim 6 wherein the central portion of said permanent magnet is perforated.

9. A rotational angle detection device as claimed in claim 2 wherein said magnetic field sensor further comprises a first bridge circuit consisting of said first to said fourth stripe groups as the four legs of said first bridge circuit, said sine wave being connected to the input of said first bridge circuit, first differential amplification means connected across the output of said first bridge circuit to provide said altered sine wave, a second bridge circuit incorporating said second sensing element into the same structure as said first bridge circuit, said cosine wave being connected to the input of said second bridge circuit, second differential amplification means connected across the output of said second bridge circuit to provide said altered cosine wave.

10. A rotational angle detection device as claimed in claim 2 wherein the central portion of said permanent magnet is perforated.

11. A rotational angle detection device as claimed in claim 2 wherein said permanent magnet is bar-shaped.

12. A rotational angle detection device as claimed in claim 1 wherein said at least two magnetoresistive sensing elements are arranged on the same substrate.

13. A rotational angle detection device as claimed in claim 12 wherein said permanent magnet is bar-shaped.

14. A rotational angle detection device as claimed in claim 12 wherein the central portion of said permanent magnet is perforated.

15. A rotational angle detection device as claimed in claim 1 wherein said voltage difference detector involves a filter circuit for eliminating undesirable noise.

16. A rotational angle detection device as claimed in claim 1 wherein said power supplying means involves a digital to analog converter.

17. A rotational angle detection device as claimed in claim 1 further comprising a rotational angle indicator for indicating the outcome of said calculator.

18. A rotational angle detection device as claimed in claim 1 wherein said magnetic field sensor comprises first and second magnetoresistive sensing elements, a first bridge circuit including said first sensing element and a second bridge circuit including said second sensing element, said sine wave being applied to the input of said first bridge circuit, first differential amplification means connected across the output of said first bridge circuit to provide said altered sine wave, said cosine wave being applied to the input of said second bridge circuit, said differential amplification means connected across the output of said second bridge circuit to provide said altered cosine wave.

19. A rotational angle detection device as claimed in claim 1 wherein each of said bridge circuits has four legs, said sensing elements forming one leg of each of said bridge circuits, respectively.

20. A rotational angle detection device as claimed in claim 1 wherein said permanent magnet is bar-shaped.

21. A rotational angle detection device as claimed in claim 1 wherein the central portion of said permanent magnet is perforated.

* * * * *

UNITED STATES PATENT AND TRADEMARK OFFICE
CERTIFICATE OF CORRECTION

PATENT NO. : 4,490,674
DATED : Dec. 25, 1984
INVENTOR(S) : Ito

It is certified that error appears in the above-identified patent and that said Letters Patent is hereby corrected as shown below:

Column 1, line 39, change "roraty" to --rotary--.

Column 2, line 19, before "generates" insert --which--;

line 61, change "alloy-each" to --alloy. Each--.

Column 3, line 64, change "and" to --or--; same line, change "or" to --and--.

Column 4, line 15, change "and" to --are--.

Signed and Sealed this

Eighth Day of October 1985

[SEAL]

Attest:

Attesting Officer

DONALD J. QUIGG

Commissioner of Patents and Trademarks—Designate